Jan. 16, 1940.                J. R. THORP                2,187,000
FROST SHIELD
Filed Dec. 28, 1933
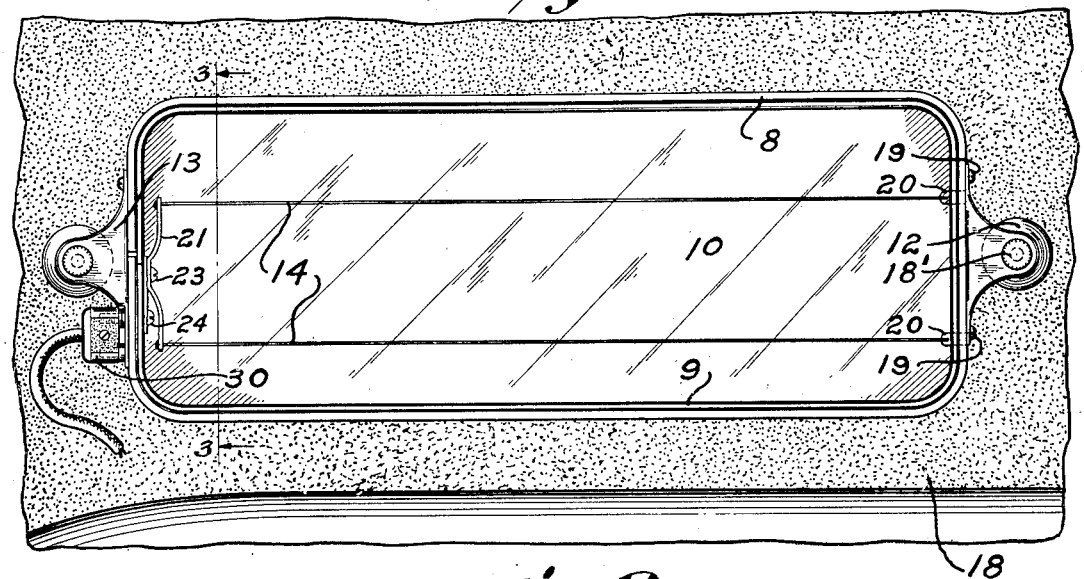
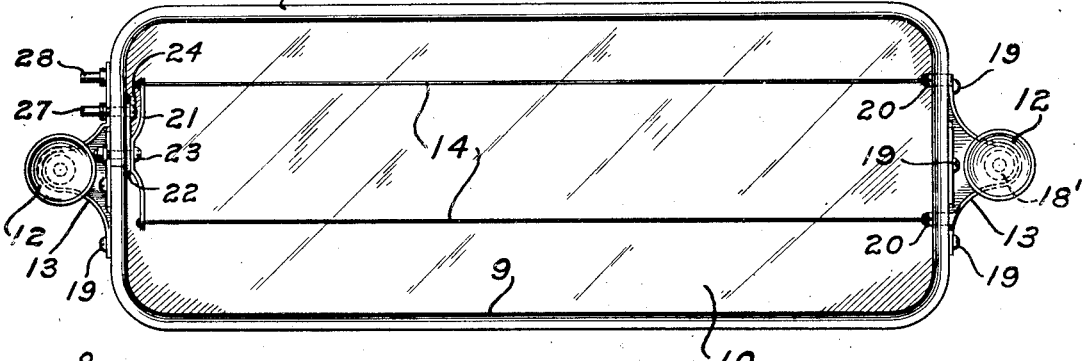
INVENTOR.
J. R. Thorp
BY
Morsell, Lieber & Morsell
ATTORNEYS.

Patented Jan. 16, 1940

2,187,000

UNITED STATES PATENT OFFICE 2,187,000

FROST SHIELD

Joel R. Thorp, West Allis, Wis., assignor to The Fulton Company, West Allis, Wis., a corporation of Wisconsin Application December 28, 1933, Serial No. 704,215

14 Claims. (Cl. 219—19)

The present invention relates generally to improvements in the construction of so-called frost shields for maintaining clear vision through the windshield or other windows of a vehicle by preventing deposition of view obstructing coatings of substances such as moisture, frost, ice or snow, thereon.

An object of the invention is to provide an improved frost shield which is simple and compact in construction, and which is also highly effective in actual use.

Another object of the invention is to provide a rigid and durable frame structure for frost shields or the like, which will offer least obstruction to the vision of a user or occupant of the vehicle.

A further object of the invention is to provide an improved artificially heated clear vision device which can be manufactured and sold at moderate cost, and which is operable with minimum expense.

Still another object of the invention is to provide an improved electrically heated frost shield which can be readily assembled, installed, and operated.

An additional object of the invention is to provide various improvements in the details of construction of detachable clear vision devices, whereby the difficulties of manufacture are minimized, while the efficiency of operation is enhanced to a maximum.

These and other objects and advantages will be apparent from the following detailed description, and some of the novel features of frost shield construction, shown but not claimed herein, form the subject of my prior Patent No. 2,002,722, granted May 28, 1935.

A clear conception of one embodiment of the several features constituting the present improvement, and of the mode of constructing, of applying, and of utilizing frost shields built in accordance therewith, may be had by referring to the drawing accompanying and forming a part of this specification in which like reference characters designate the same or similar parts in the various views:

Fig. 1 is an inside or rear view of a portion of the frost coated windshield of a vehicle, showing the improved frost shield applied to the inner surface thereof;

Fig. 2 is a reversed or front plan view of the frost shield alone, with the heater energizing plug omitted therefrom;

Fig. 3 is an enlarged transverse vertical section through the frost shield, taken along the line 3—3 of Fig 1;

Fig. 4 is a fragmentary further enlarged section through the frost shield, taken along the line 4—4 of Fig. 3; and Fig. 5 is a similarly enlarged transverse section through the frame of the frost shield, taken on the line 5—5 of Fig. 4.

Although the improved device has been designated herein as being a "frost shield", it will be understood that the appliance is not merely capable of maintaining the window to which it may be applied, free from frost coatings, and that it is in fact operable to prevent deposition of other vision obstructing coatings.

Referring to the drawing, the improved frost shield disclosed therein by way of illustration, comprises in general a substantially rectangular frame composed of an outer metallic band 8 and a soft rubber seal 9 attached within the frame; a transparent sheet 10 of glass or the like coacting along its entire peripheral edge with a groove 11 formed in the seal 9; supporting elements 12 such as rubber suction cups detachably secured to the frame through end brackets 13; and one or more heating elements or wires 14 carried by the frame and bracket structures and spanning the interior of the main frame adjacent to the transparent sheet 10.

The metallic band 8 may be formed of strip metal cut to proper length and bent to form, and has channel shaped cross section throughout its length by virtue of the provision of outer and inner flanges 15, 16 which are inclined toward each other to form a dovetailed recess. The rubber seal 9 is likewise preferably formed of strip material having uniform cross-section of the shape shown in Fig. 5, and has a dovetail shaped outer portion adapted to snugly fit the recess formed in the band 8 by the flanges 15, 16. It is to be noted, that the glass sheet 10 is engaged only by the relatively soft seal 9 and does not contact with the metal band 8, and the edge of the seal 9 remote from the groove 11 therein, is provided with a relatively flexible window engaging lip 17 which may be biased outwardly over the flange 15 so as to prevent direct contact between the windshield 18 and the metal band 8. The lip 17 is sufficiently flexible so that it will not interfere with the normal action of the supporting elements 12, and insures perfect sealing of the space within the frost shield when the device has been applied to a window.

The supporting elements 12 may be two or more in number, and are detachably secured to the brackets 13 by means of clamping members 18' which coact with screw threaded studs secured to the elements 12. The end brackets 13 may be formed of sheet metal, and are rigidly attached to the outer band 8 of the frame, by means of screws 19, and otherwise in a manner to be described later.

One of the brackets 13 is provided with vertically spaced integral metal projections 20 shown in Figs. 1 and 2, which extend through openings in the band 8 and seal 9, into the space enclosed by the frost shield. Corresponding ends of the heating wires 14 are attached to the projections 20, and the opposite corresponding ends of the heating elements are attached to a leaf spring connector 21 which coacts with a conductor plate 22 engaging the inner surface of the seal 9 as shown in Figs. 4 and 5. The connector 21 and plate 22 are secured to the frame structure by bolts 23, 24 both of which are insulated from the metal band 8 and from the adjacent bracket 13, by means of insulating washers 25, these bolts passing through enlarged openings in the band and bracket so as to avoid short circuiting. A nut 26 coacts with the screw threaded end of the bolt 23, and a terminal post 27 likewise coacts with the bolt 24, to provide additional clamping effect between the band 8 and the adjacent bracket 13. This assemblage therefore provides an electrical connection between the wires 14 and the terminal post 27, through the connector 21, plate 22, and bolt 24. Another terminal post 28 disposed near the post 27, is clamped directly to the frame band 8 and to the adjacent bracket 13, by a screw 29, so as to complete the electrical connection between the opposite ends of the wires 14 and the terminal post 28 through the projections 20, brackets 13, band 8 and screw 29. The terminal posts 27, 28 are however insulated from each other, and a readily detachable connector plug 30 is adapted to connect these terminal posts with a suitable source of electric energy, such as a battery. As previously stated, the heating wires 13 span the space enclosed by the frame of the frost shield, being located about midway between the sheet 10 and the windshield 18, and care being taken to avoid actual contact with the wires with the glass.

When applying the improved frost shield to a window, it is preferable to place a small amount of sealing fluid such as cement, upon the supporting elements 12 and perhaps also upon the flexible lip 17, before mounting the appliance upon the windshield 18, so as to insure tight sealing and rigid suspension. The frame structure may however be removed from the elements 12 at any time, by merely releasing the clamping members 18', and the connector plug 30 may also be applied or removed at the will of the user. When it is desired to utilize the artificial heating, it is only necessary to apply the plug 30 to the terminal posts 27, 28, whereupon the wires 14 will quickly heat the space confined by the frame structure between the sheet 10 and the windshield 18, sufficiently to melt any ice deposits which may tend to accumulate upon the outer surface of the windshield, thus maintaining clear vision through the transparent sheet 10 and windshield 18. It is not necessary, however, to utilize the artificial heat in order to prevent moisture deposits such as dew, upon the windshield 18, so that the plug 30 may be removed from the posts 27, 28 when no ice removal is necessary, at which time the confined air is ordinarily effective in maintaining clear vision.

The use of a channel shaped metal band 8 provides an inexpensive, rigid, and durable stiffening medium for the frame structure; and the cooperative use of the relatively soft and flexible rubber seal 9 provides an effective sealing medium which protects the glass sheet 10 against breakage during and after assembly of the structure. The frame structure while possessing great rigidity, is relatively thin and light thereby offering least obstruction to the view of the user, and can be manufactured at minimum cost. The entire assemblage when properly finished presents an attractive appearance, and the electrically energized heating wires operate very effectively while also offering least obstruction to the vision. The improved appliance may be quickly applied to any window and has proven highly successful in actual use.

It should be understood that it is not desired to limit the invention to the exact details of construction and to the precise mode of use herein shown and described, for various modifications within the scope of the claims may occur to persons skilled in the art.

It is claimed and desired to secure by Letters Patent:

1. In combination, a continuous substantially rectangular metal band having inwardly extending integral flanges biased toward each other to form a dovetailed recess, a rubber seal having one side thereof provided with a dovetailed projection confined within said recess and also having a continuous groove in the opposite side thereof, a transparent sheet having its peripheral edge disposed within said groove, said seal having a flexible edge remote from said sheet and extending outwardly adjacent to one of said band flanges, and means carried by said frame for urging said flexible edge in contact with a window glass.

2. In combination, a continuous rubber sealing strip having an inner continuous groove and a continuous outwardly directed flexible lip disposed laterally of said groove, a transparent sheet having its peripheral edge confined within said groove, and a metal band secured to the exterior of said strip and extending around said groove and between said lip and the grooved strip portion.

3. In combination, a channel shaped metallic outer band, a rubber seal having a portion thereof confined within said band, a transparent sheet having its edge confined only within said seal, heating wires spanning the space within said seal adjacent to said sheet, means providing a direct connection between corresponding ends of said wires and said band at one end of said sheet, a leaf spring conductor connected to the opposite ends of said wires, and a contact connected directly to said conductor, said contact being carried by but insulated from said band at the opposite end of said sheet.

4. In combination, a metal outer band having a continuous inner recess, a continuous rubber seal within said band and having an inner groove and a continuous flexible lip, and a transparent sheet coacting along its periphery with said groove to hold said seal within said recess, said lip being offset from and extending outwardly beyond said band.

5. In combination, a continuous rigid outer metal band, a continuous flexible seal provided with a projection confined within said band and having an inner grove and a continuous flexible lip projecting outwardly laterally of said band, a transparent sheet coacting with said groove to hold said strip within said band, said lip being remote from said band and groove, and means carried by said band for detachably supporting the same directly from a window glass.

6. In combination, a metal outer band having a continuous inner recess, a continuous rubber seal having a projection disposed within said recess and having an inner groove and a continuous flexible lip, a transparent sheet coacting along its periphery with said groove to confine said strip projection within said recess, said lip being remote from and extending outwardly beyond said band, and suction cups carried by said band for detachably supporting the same directly from a window glass.

7. In combination, a continuous rigid outer band, a continuous flexible seal provided with a projection confined within said band and having an inner groove and a continuous flexible lip projecting outwardly and disposed laterally beyond an edge of said band, and a transparent sheet coacting with said groove to hold said seal within said band.

8. In combination, a continuous rigid outer band, a continuous flexible seal provided with a projection confined within said band and having an inner groove and a continuous flexible lip projecting outwardly laterally of said band, a transparent sheet coacting with said groove to hold said seal within said band, and heating means disposed within said seal closely adjacent to said sheet.

9. In a frost shield, a continuous rubber seal having an internal groove and a continuous flexible lip spaced from the groove and adapted to engage a windshield, a transparent sheet having its peripheral edge confined within said groove, and a frame externally engaging said seal and embracing the grooved portion thereof remote from said lip.

10. In a frost shield, a continuous rubber seal having an internal groove and a continuous flexible lip spaced from the groove and adapted to engage a windshield, a transparent sheet having its peripheral edge confined within said groove, a frame externally engaging said seal and embracing the grooved portion thereof remote from said lip, and heating means disposed within the space surrounded by said seal and located between said sheet and the windshield.

11. A windshield heater comprising, a frame of angular transverse cross section, a glass-holding member of rubber disposed within the frame and provided with a flexible lip projecting beyond the frame and adapted to engage the windshield and also provided with a glass-receiving groove, a pane of glass carried by said member and having its edges received in said groove, said glass urging the glass-holding member against the frame and retaining it therein, spaced terminals on said frame, and heating elements connecting said terminals.

12. A windshield heater comprising a metal frame having a reveal opening and being substantially L-shaped in cross section; a pane of glass fitting within said frame; a sealing strip having a grooved portion fitting over and embracing the marginal edge of the pane and having a portion interposed between the pane and the margin of the reveal; and means on the sealing strip and on the frame interlocking to hold the sealing strip in the frame.

13. A windshield heater comprising a frame L-shaped in cross section, a glass-holding member of rubber fitting within the frame and provided with a flexible lip projecting beyond the frame and adapted to engage the windshield and also provided with a glass-receiving groove, a pane of glass carried by said member and having its edges received in said groove, said glass clamping the glass-holding member against the frame and retaining it therein, spaced terminals on said frame and electric heating resistors connecting said terminals.

14. A windshield heater comprising a frame L-shaped in cross section, a glass-holding member of rubber fitting within the frame and provided with a flexible lip projecting beyond the frame and adapted to engage the windshield, and also provided with a glass-receiving groove, a pane of glass carried by said member and having its edges received in said groove, said glass clamping the glass-holding member against the frame and retaining it therein.

JOEL R. THORP.